J. W. HOLLIS.
ELASTIC BACK-BANDS FOR HARNESS.
No. 169,994. Patented Nov. 16, 1875.
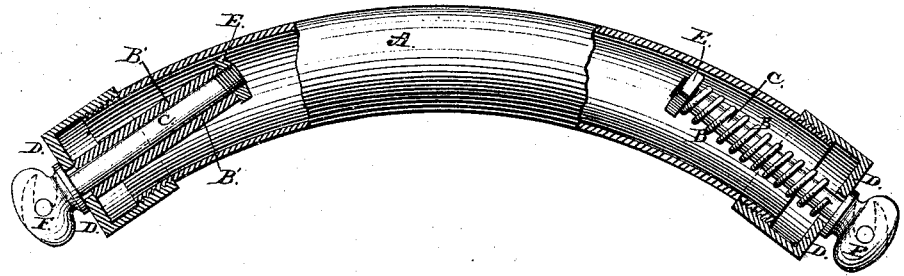
Attest:
W. E. Bassett
George H. High
Inventor:
John W. Hollis

UNITED STATES PATENT OFFICE.

JOHN W. HOLLIS, OF CINCINNATI, OHIO, ASSIGNOR OF TWO-THIRDS HIS RIGHT TO AMERICUS WARDEN, CHARLES C. CAMPBELL, AND EDWIN C. BUSH, OF SAME PLACE.

IMPROVEMENT IN ELASTIC BACK-BANDS FOR HARNESS.

Specification forming part of Letters Patent No. 169,994, dated November 16, 1875; application filed April 1, 1875.

*To all whom it may concern:*

Be it known that I, JOHN W. HOLLIS, of Cincinnati, Hamilton county, Ohio, have invented an Elastic Back-Band, of which the following is a specification:

This invention relates to that class of devices commonly known as back-chains; and the improvement consists, principally, in an elastic arrangement to dissipate the force of the shock to the animal caused by the irregular movements of the vehicle.

The accompanying drawing represents a sectional view through the center, in the plane of the curve, B representing a spiral, and B' a gum spring.

A is a tube bent to the curve of the saddle, having in either end a stout spring, B B', of any elastic form or substance, secured in position by the rod C C passing through a slot in the nut D D, and terminating at the lower end in a hook or eye, F F, and having on its other end a nut, E E.

The device is used in one piece, placed over the saddle in the same manner as a back-chain, and the shafts attached to the hook or eye at its respective ends, and the springs, being acted upon by the motion of the shafts, receive and dissipate the shock, thereby relieving the animal, enabling it to work with more ease.

I claim as my invention—

The combination of the bent tube with the hook or eye rods and springs, substantially as described, and for the purpose set forth.

In testimony of which invention I hereunto set my hand.

JOHN W. HOLLIS.

Witnesses:
   W. E. BASSETT,
   GEO. H. HIGH.